United States Patent
Allison et al.

(10) Patent No.: US 10,711,150 B2
(45) Date of Patent: Jul. 14, 2020

(54) COLOR DEVELOPMENT WRITING COMPOSITIONS AND WRITING INSTRUMENTS

(71) Applicant: Crayola LLC, Easton, PA (US)

(72) Inventors: Keith J. Allison, Blandon, PA (US); Victor Hugo Bedoya, Easton, PA (US)

(73) Assignee: Crayola LLC, Easton, PA (US)

( * ) Notice: Subject to any disclaimer, the term of this patent is extended or adjusted under 35 U.S.C. 154(b) by 99 days.

(21) Appl. No.: 15/965,190

(22) Filed: Apr. 27, 2018

(65) Prior Publication Data

US 2019/0016912 A1    Jan. 17, 2019

Related U.S. Application Data

(60) Provisional application No. 62/555,917, filed on Sep. 8, 2017, provisional application No. 62/531,556, filed on Jul. 12, 2017.

(51) Int. Cl.

| | | |
|---|---|---|
| C09D 13/00 | (2006.01) | |
| C09D 7/48 | (2018.01) | |
| C09D 7/61 | (2018.01) | |
| C09D 7/63 | (2018.01) | |
| C09D 123/04 | (2006.01) | |
| C09D 123/06 | (2006.01) | |
| C09D 191/06 | (2006.01) | |
| B43K 19/02 | (2006.01) | |
| B43K 19/14 | (2006.01) | |
| B43K 19/18 | (2006.01) | |
| C09D 5/00 | (2006.01) | |
| C08K 5/00 | (2006.01) | |

(52) U.S. Cl.
CPC .............. *C09D 13/00* (2013.01); *B43K 19/02* (2013.01); *B43K 19/14* (2013.01); *B43K 19/18* (2013.01); *C09D 5/00* (2013.01); *C09D 7/48* (2018.01); *C09D 7/61* (2018.01); *C09D 7/63* (2018.01); *C09D 123/04* (2013.01); *C09D 123/06* (2013.01); *C09D 191/06* (2013.01); *C08K 5/0016* (2013.01); *C08K 5/0041* (2013.01)

(58) Field of Classification Search
CPC ....... C09D 13/00; C09D 123/06; B43K 19/00
See application file for complete search history.

(56) References Cited

U.S. PATENT DOCUMENTS

| | | | |
|---|---|---|---|
| 3,957,495 A * | 5/1976 | Teranishi | C09D 13/00 106/31.16 |
| 4,229,334 A | 10/1980 | Klabacka et al. | |
| 4,768,987 A | 9/1988 | Usui et al. | |
| 5,261,952 A * | 11/1993 | Craig | C09D 13/00 106/31.07 |
| 5,460,647 A | 10/1995 | Snedeker et al. | |
| 5,464,470 A * | 11/1995 | Brachman | C09D 13/00 106/31.08 |
| 5,591,787 A | 1/1997 | Schlennert et al. | |
| 6,124,377 A | 9/2000 | Kaiser et al. | |
| 6,262,143 B1 * | 7/2001 | Leidner | C09D 13/00 523/164 |
| 2003/0100629 A1 * | 5/2003 | Appel | C09D 13/00 523/164 |
| 2004/0016366 A1 | 1/2004 | Hashimoto et al. | |
| 2005/0096426 A1 | 5/2005 | Beck et al. | |
| 2013/0177345 A1 | 7/2013 | Kitazawa et al. | |
| 2014/0291585 A1 * | 10/2014 | Tozuka | B43K 19/18 252/500 |
| 2015/0104234 A1 | 4/2015 | Falken | |
| 2015/0376433 A1 * | 12/2015 | Tozuka | C09D 13/00 15/427 |
| 2016/0075904 A1 * | 3/2016 | Tozuka | C09D 133/00 524/57 |
| 2017/0051173 A1 | 2/2017 | Thanh et al. | |
| 2017/0349775 A1 | 12/2017 | Claptien | |
| 2019/0077175 A1 * | 3/2019 | Allison | C09D 7/61 |

FOREIGN PATENT DOCUMENTS

| | | |
|---|---|---|
| CA | 2048183 A1 | 2/1992 |
| EP | 2055733 A1 | 5/2009 |
| GB | 1051504 | 12/1966 |
| GB | 1212469 | 11/1970 |
| JP | 11116880 A | 4/1999 |
| RO | 83691 A1 | 3/1984 |
| WO | 2016097555 A1 | 6/2016 |

OTHER PUBLICATIONS

Ellis et al., "Categories of Wax-Based Drawing Media", WAAC Newsletter, Sep. 1997, vol. 19, No. 3, pp. 1-5.
Great Britain Search Report for Great Britain Application No. GB1811244.1, dated Oct. 4, 2018—3 pages.

* cited by examiner

*Primary Examiner* — Helene Klemanski
(74) *Attorney, Agent, or Firm* — RatnerPrestia

(57) ABSTRACT

Writing compositions capable of undergoing a color development when brought into contact with a specific substrate including a color change-inducing compound are provided. Application of the writing compositions to surfaces other than the intended substrate will avoid color development and prevent staining of the unintended surfaces. The writing compositions include at least one particulate filler including a clay, at least one leuco dye, one or more waxes chosen from a group consisting of polyethylene wax, soy wax, paraffin wax, and beeswax, at least one thermoplastic binder material including a polyethylene, titanium dioxide, and optionally at least one additive.

19 Claims, No Drawings

COLOR DEVELOPMENT WRITING COMPOSITIONS AND WRITING INSTRUMENTS

CROSS REFERENCE TO RELATED APPLICATIONS

This application claims priority to U.S. Provisional Application No. 62/555,917, filed Sep. 8, 2017 and to U.S. Provisional Application No. 62/531,556, filed Jul. 12, 2017. Each of these applications is incorporated by reference herein, in its entirety and for all purposes.

FIELD OF THE INVENTION

The present invention relates generally to writing compositions for use as marking or coloring materials. More specifically, the present invention relates to writing compositions for use with specific marking substrates in systems such that stray marks of color are prevented from appearing on unintended surfaces.

BACKGROUND OF THE INVENTION

Art materials for the entertainment and developmental benefit of children are well-known. For example, drawing and writing materials, such as pencils and crayons, are typically given to children to produce artwork and to stimulate the children's creativity and imagination. To contribute to a pleasant use experience for children, pencil cores and crayons must be capable of smooth laydown and high intensity or vibrancy of the resulting colored markings. Pencils and crayons must also be sufficiently flexible and resist breakage such that they can be used by children without snapping. Other beneficial characteristics are the ability to layer and alter the shade of colored marks during use and the ability to substantially erase the colored marks.

Unfortunately, a significant drawback related to typical colored pencils and crayons is that when used by children, they often contribute to messy staining and marking of unintended objects, such as carpets, furniture, walls, or clothing. As a result, adults are often hesitant to provide such crayons and colored pencils to children to avoid potential stains of unintended surfaces.

Thus, there exists a need for writing or marking compositions that prevent formation of stains on surfaces unintended for marking and that develop marks or color only when applied to an intended substrate or surface for marking. Particularly, there exists a need for writing compositions that are substantially non-staining or marking on unintended objects such as carpets, furniture, walls, and clothing, but can generate a varied range of colors when used in conjunction with and applied to an intended substrate.

SUMMARY OF THE INVENTION

An embodiment of the present invention provides writing compositions that impart colored marks to an intended substrate, but avoid staining unintended objects to which they are applied, such as clothing or carpet. The writing compositions comprise at least one particulate filler (e.g., kaolin clay), at least one leuco dye, one or more waxes chosen from a group consisting of soy wax, paraffin wax, and beeswax, at least one thermoplastic binder material including polyethylene (e.g., high-density polyethylene, low-density polyethylene), titanium dioxide, and optionally at least one additive (e.g., lubricants, plasticizers, preservatives, and antioxidants).

The writing compositions are capable of developing vibrant color upon application to or contact with a substrate having a color change-inducing compound. The substrate's color change-inducing compound is capable of initiating a color change in the leuco dye within the writing compositions.

A further embodiment of the present invention provides writing instruments (e.g., pencils, crayons) comprising writing compositions according to the present invention.

DETAILED DESCRIPTION OF THE INVENTION

The present invention relates to writing compositions capable of undergoing a color development when brought into contact with a specific substrate having a color change-inducing compound. Suitable substrates are described in U.S. Pat. No. 6,124,377, which is incorporated herein by reference for all purposes. The substrate includes a treated surface having a coating comprising a color change-inducing compound or developer. The substrate is coated in specific locations where color development is desired, while other locations have no coating to prevent color development. The color change-inducing compound interacts chemically with a color precursor/colorant present in the writing compositions (e.g., a leuco dye) to produce a chromophore that results in a visible color forming in or on the substrate.

The color change-inducing compound is preferably acidic, or includes acidic functional groups. For example, if the color precursor/colorant is a leuco dye, the color change-inducing compound may be a Lewis acid. Desirable Lewis acids include, but are not limited to, zinc-containing resins, certain clays, or phenolic resins. The Lewis acid causes a rearrangement of the leuco dye molecule, which results in the development of a chromophore of intense color.

The coating of the substrate may also include one or more binders for retaining the coating components on the substrate. Color formed on the substrate is not easily transferred from the substrate to unintended surfaces. Apart from the specific substrate including a color change-inducing compound, application of the writing compositions to unintended surfaces will resist developing color or will not result in color development or staining of the unintended surfaces.

The writing compositions may be extruded or injection molded into different shapes (e.g., pencils, pencil cores, crayons). Additionally, the writing compositions exhibit high strength characteristics and are break resistant such that cores prepared from the compositions can be used without being sheathed in rigid materials, e.g., wood or plastic coverings. It has also been surprisingly found that the compositions are capable of being layered such that they may be shaded or blended on the substrate. The compositions may also be substantially erasable with standard pencil erasers.

The writing compositions comprise at least one particulate filler including a clay, at least one leuco dye, one or more waxes chosen from a group consisting of soy wax, paraffin wax, and beeswax, at least one thermoplastic binder material including a polyethylene, titanium dioxide, and optionally at least one additive.

It has been surprisingly found that the marks made by the writing compositions are substantially erasable with standard, ordinary pencil erasers (i.e., the compositions may be substantially or mostly removed from an intended substrate using a standard pencil eraser with minimal smearing). It has been found that the writing compositions are also easily mechanically extruded or injection molded. Moreover, it has also been found that the compositions produce writing instruments capable of being used to apply markings to a surface with minimally protective, supportive sheaths or coverings of rigid material to prevent breakage. The compositions also display blending and shading capabilities.

The compositions may also be applied to objects and surfaces lacking a suitable color-development substrate without staining or marking the objects or surfaces. The compositions of the present invention include dyes (i.e., leuco dyes) which have minimal or no color prior to coming into contact with a color-change or color-development compound within a suitable substrate. Thus, the compositions of the present invention may be inadvertently applied to an unintended object or surface, for example, by a child, without the dyes leaving a mark. The writing compositions will only develop vibrantly colored markings when brought into contact with an intended substrate including the desired color-development compound. The substrate may be applied to paper.

The coating of the substrate may include a liquid vehicle (e.g., water) into which constituents of the coating are mixed to facilitate application of the coating to the substrate surface. The coating may also include one or more binders (e.g., clay, polymeric binder), a color change-inducing compound (e.g., a phenolic resin), one or more void cell formers (e.g., calcium carbonate), and one or more additives (defoamers, color retardants, surfactants, buffers). An exemplary coating composition is provided in Table 1:

TABLE 1

Example Coating Mixture

| Component | Function | Weight Percentage (wt %) |
|---|---|---|
| Water | Vehicle | 28.54 |
| Surfynol PC | Defoamer | 0.06 |
| Surfynol 104A | Surfactant | 0.06 |
| ASP NC Kaolin Clay | Clay | 24.29 |
| Calcium Carbonate | Opacifying filler | 1.6 |
| Ansilex 93 Slurry | Clay-TiO2 mixture | 13.18 |
| Ecokote 4361 | Polymeric binder | 11.86 |
| Durez 33446 | Phenolic resin/ color developer | 20.41 |
| TOTAL | | 100 |

An embodiment of a writing composition according to the present invention includes at least one suitable particulate filler including a clay. The clay may be any clay, such as a kaolin clay. The filler may provide stiffness and strength to the lead compositions to resist bending and breaking. The filler may also include other strengthening agents, such as mineral fillers (e.g., mica, mineral carbonates such as calcium carbonate). The compositions of the present invention may include filler in any suitable amount. Preferably, the filler (e.g., kaolin clay) is present in an amount between about 30% and 70% by weight of the composition. More preferably, the filler is present in an amount between about 40% and 60% by weight. Even more preferably, the filler is present in an amount of about 45% to 55% by weight.

The compositions also include a colorant (i.e., a leuco dye). The leuco dye may be brought into contact with a specific substrate having a coating including a color change-inducing compound to develop color. The coating may be applied to any location on the substrate where color is desired; the substrate may lack the coating in other locations where color is not desired so as to impede color development in those locations on the substrate. Additionally, the leuco dye does not develop vibrant color when applied to other, unintended surfaces in the absence of the substrate and its coating having the color change-inducing compound. The colorant/dye may have no color or only minimal color in the absence of contact with a color change-inducing compound. The colorant/dye can be present in the writing compositions in any suitable amount. Preferably, the colorant is present from about 0.1% to about 8% by weight of the writing composition. More preferably, the colorant is present from about 0.5% and 6% by weight of the writing composition. Even more preferably, the colorant is present in an amount of about 3% by weight of the writing composition.

A thermoplastic binder material provides integrity to the writing compositions by holding the components of the compositions together. The thermoplastic binder also contributes to the ability to both extrude (hot-melt extrude and/or ram-extrude) and injection mold the compositions into desirable shapes. The binder may be any thermoplastic, extrudable material that imparts moldability, strength, and allows for smooth laydown characteristics of the compositions. Preferably, the binder includes a polyethylene (e.g., high-density polyethylene/HDPE, low-density polyethylene/LDPE).

The thermoplastic binder material (e.g., HDPE and/or LDPE) may be present in any suitable amount in the compositions. Preferably, the binder material is present in an amount between about 10% and about 30% by weight of the composition. More preferably, the binder material is present in an amount between about 15% and about 25% by weight. Even more preferably, the binder material is present in an amount of about 20% by weight.

The writing compositions of the present invention also include at least one wax. The waxes may be either synthetic (e.g., polyethylene wax) or naturally occurring waxes (e.g., soy wax, paraffin wax, beeswax). The wax may contribute to improved color intensity of the writing compositions after application to a suitable substrate and to smooth laydown properties.

The wax may be present in any suitable amount. A wax or a combination of waxes is preferably included in an amount between about 5% and about 30% by weight of the composition. More preferably, the wax or combination of waxes is present in an amount between about 10% and 25% by weight of the composition. Preferably, the compositions include both soy wax and paraffin wax. Preferably, soy wax is included in an amount of between about 4.5% and about 20% by weight of the composition. Preferably, paraffin wax is present in an amount between about 0.5% and about 15% by weight.

The writing compositions of the present invention also comprise titanium dioxide. The titanium dioxide masks or disguises premature development of color to prevent development of stains or marks on any surfaces other than that of the substrate. The titanium dioxide may be present in any suitable amount in the compositions. Preferably, the titanium dioxide is present in an amount between about 1% and 15% by weight. More preferably, the titanium dioxide is present in an amount between about 3% and 12%.

According to certain embodiments, writing compositions of the present invention include optional additives. These additives may include, but are not limited to, dispersing agents, thermal stabilizers, scents, glitter, lubricants, plasticizers, preservatives, and antioxidants. In particular embodiments, the compositions of the present invention comprise between about 0.1% and about 5% by weight additive(s). Other particular embodiments of the compositions comprise between about 0.5% and about 3% by weight additives.

Such additives are readily available from numerous sources. One or more preservatives, such as anti-microbial agents and fungicides, can be added to increase the shelf life of the compositions according to the present invention. Some examples of preservatives include Fungitrol® 940, Kathon® LX, Nuosept® 95, Acticide® LA, and Polyphase® P100. Process aids, such as Hydropalat® 44, can be added to aid in mixing of the components. Lubricants or plasticizers, such as oleic acid and isobutyl stearate, can be added to soften the compositions to improve the transfer of compositional constituents, such as the colorant, to the substrate. One or more antioxidants may be added to the compositions to aid the titanium dioxide in masking or impeding premature color development of the colorant. Thermal stabilizers, such as Irganox® B 225, prevent the compositions from developing color under exposure to heat. A scent or fragrance may also be added to the composition.

According to an embodiment, the writing composition comprises, consists essentially of, or consists of: leuco dye, titanium dioxide, soy wax, paraffin wax, LDPE, HDPE, kaolin clay, isobutyl stearate, and oleic acid. In another embodiment of the present invention, the writing composition comprises, consists essentially of, or consists of: soy wax, LDPE, paraffin wax, HDPE, kaolin clay, titanium dioxide, thermal stabilizer, isobutyl stearate, oleic acid, and leuco dye. In yet another embodiment of the present invention, the writing composition comprises, consists essentially of, or consists of: HDPE, paraffin wax, soy wax, isobutyl stearate, oleic acid, kaolin/burgess clay, titanium dioxide, and leuco dye.

The compositions produced according to embodiments of the invention set forth herein may also be formed into different shapes, including into pencil core shapes, crayon shapes, or mechanical pencil core shapes by a variety of processes; that is, the compositions are versatile with respect to their processing capability. For example, the compositions may be injection molded, hot-melt extruded, or ram extruded into pencil cores or crayon stick shapes. The compositions may be formed into any shape suitable for a writing instrument via injection molding and/or extrusion. Despite the differences in these processing techniques, the compositions according to embodiments of the invention herein are generally suitable for either process and produce writing instruments having the same desirable properties.

Crayons, pencil cores and/or pencils produced from the compositions according to embodiments of the invention herein may be covered or wrapped in supportive sheaths or coatings. The sheaths may be made of wood or plastic. Alternatively, or in addition to a sheath, a coating layer of thermoplastic material (e.g., HDPE) may be applied to the outside of pencil cores and/or pencils produced from the compositions according to the invention herein.

As used herein, a percentage (%) refers to a weight percentage of the composition, unless indicated otherwise. The term "Lbs." as used herein refers to an amount in pounds of all components in the total composition.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention.

The following examples are provided to describe the invention in greater detail and are intended to illustrate, not limit, the invention.

EXAMPLES

While exemplary compositions are set forth below, alternative compositions will be apparent to those skilled in the art. Such artisans will be able to modify the compositions with an eye toward the desired performance properties and intended use.

Example 1

A "base" mixture component of writing compositions according to certain embodiments of the invention herein is shown in Table 2. The "base" mixture is formed by combining soy wax, paraffin wax (refined), LDPE, and kaolin clay.

TABLE 2

"Base" Mixture

| Component | Lbs. | Weight Percentage (wt %) |
|---|---|---|
| Soy wax | 0.75 | 15 |
| LDPE | 1.5 | 30 |
| Paraffin wax (refined) | 0.25 | 5 |
| Kaolin clay | 2.5 | 50 |
| TOTAL | 5.0 | 100 |

After forming the "base" mixture depicted in Table 1, additional soy wax, additional LDPE, additional kaolin clay, HDPE, titanium dioxide, additives, and leuco dyes were then added to the "base" mixture and blended until substantial homogeneity was achieved to result in the writing compositions depicted in Table 3. The order of mixing may be modified as needed. Each composition includes a different leuco dye such that the marks produced by each respective composition when brought into contact with the substrate result in a different color as displayed below.

TABLE 3

| Component | Yellow (Lbs.) | Orange (Lbs.) | Blue (Lbs.) | Green (Lbs.) | Violet (Lbs.) | Red (Lbs.) | Brown (Lbs.) | Black (Lbs.) |
|---|---|---|---|---|---|---|---|---|
| "Base" Mixture | 0.66 | 0.66 | 0.66 | 0.66 | 0.66 | 0.66 | 0.66 | 0.76 |
| Soy Wax | 0.5 | 0.5 | 0.5 | 0.5 | 0.5 | 0.5 | 0.5 | 0.5 |
| LDPE | 0.4 | 0.4 | 0.4 | 0.4 | 0.4 | 0.4 | 0.4 | 0.4 |
| HDPE | 0.35 | 0.35 | 0.35 | 0.35 | 0.35 | 0.35 | 0.35 | 0.35 |
| Kaolin Clay | 1.622 | 1.622 | 1.622 | 1.622 | 1.622 | 1.622 | 1.622 | 1.622 |
| Titanium Dioxide | 0.28 | 0.32 | 0.32 | 0.32 | 0.32 | 0.32 | 0.32 | 0.16 |

TABLE 3-continued

| Component | Yellow (Lbs.) | Orange (Lbs.) | Blue (Lbs.) | Green (Lbs.) | Violet (Lbs.) | Red (Lbs.) | Brown (Lbs.) | Black (Lbs.) |
|---|---|---|---|---|---|---|---|---|
| Thermal Stabilizer (Irganox ® B 225) | 0.008 | 0.008 | 0.008 | 0.008 | 0.008 | 0.008 | 0.008 | 0.008 |
| Isobutyl stearate | 0.02 | 0.02 | 0.02 | 0.02 | 0.02 | 0.02 | 0.02 | 0.02 |
| Oleic Acid | 0.02 | 0.02 | 0.02 | 0.02 | 0.02 | 0.02 | 0.02 | 0.02 |
| Leuco Dye Yellow | 0.14 | | | | | | | |
| Leuco Dye Orange | | 0.1 | | | | | | |
| Leuco Dye Blue | | | 0.1 | | | | | |
| Leuco Dye Green | | | | 0.1 | | | | |
| Leuco Dye Violet | | | | | 0.1 | | | |
| Leuco Dye Red | | | | | | 0.1 | | |
| Leuco Dye Brown | | | | | | | 0.1 | |
| Leuco Dye Black | | | | | | | | 0.16 |
| TOTAL | 4 | 4 | 4 | 4 | 4 | 4 | 4 | 4 |

Example 2

An additional exemplary writing composition according to an embodiment of the invention is shown in Table 4 below.

TABLE 4

| Component | Weight Percentage (wt %) |
|---|---|
| Leuco Dye | 0.57 |
| Titanium Dioxide | 10 |
| Soy Wax | 14.4 |
| Paraffin Wax | 0.83 |
| LDPE | 13.7 |
| HDPE | 10 |
| Kaolin Clay | 49.5 |
| Isobutyl Stearate | 0.5 |
| Oleic Acid | 0.5 |
| TOTAL | 100.00 |

Example 3

A further exemplary writing composition according to an embodiment of the invention is shown in Table 5 below.

TABLE 5

| Component | Weight Percentage (wt %) |
|---|---|
| Leuco Dye | 1.5 |
| Titanium Dioxide | 5 |
| Soy Wax | 15.5 |
| Paraffin Wax | 13 |
| HDPE | 20 |
| Kaolin Clay | 44 |
| Isobutyl Stearate | 0.5 |
| Oleic Acid | 0.5 |
| TOTAL | 100.00 |

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An erasable writing composition for use with a substrate having a color-development coating, the composition comprising:
    at least one particulate filler including a clay;
    at least one leuco dye;
    one or more waxes chosen from the group consisting of soy wax, paraffin wax, and beeswax;
    at least one thermoplastic binder material including high density polyethylene and low density polyethylene;
    titanium dioxide; and
    optionally at least one additive.

2. The erasable writing composition of claim 1, wherein the at least one particulate filler including a clay comprises kaolin clay.

3. The erasable writing composition of claim 1, wherein the one or more waxes include soy wax and paraffin wax.

4. The erasable writing composition of claim 1, wherein the composition comprises at least one additive chosen from the group consisting of dispersing agents, lubricants, thermal stabilizers, plasticizers, preservatives, scents, glitter, and antioxidants.

5. The erasable writing composition of claim 1, wherein the optional at least one additive comprises a lubricant including at least one of isobutyl stearate or oleic acid.

6. The erasable writing composition of claim 1, wherein the optional at least one additive comprises an antioxidant.

7. The erasable writing composition of claim 1, wherein:
    the at least one particulate filler including a clay is present in an amount between about 30 wt % and 70 wt %;
    the at least one leuco dye is present in an amount between about 0.1 wt % and 8 wt %;

the one or more waxes chosen from the group consisting of soy wax, paraffin wax, and beeswax are present in an amount between about 5 wt % and 30 wt %;

the at least one thermoplastic binder material including high density polyethylene and low density polyethylene is present in an amount between about 10 wt % and 30 wt %;

the titanium dioxide is present in an amount between about 1 wt % and about 15 wt %; and the optional at least one additive is present in an amount between about 0.1 wt % and 5 wt %.

8. The erasable writing composition of claim 7, wherein the at least one particulate filler comprises kaolin clay.

9. The erasable writing composition of claim 7, wherein the optional at least one additive comprises a lubricant including at least one of isobutyl stearate or oleic acid.

10. The erasable writing composition of claim 7, wherein the optional at least one additive comprises an antioxidant.

11. The erasable writing composition of claim 7, wherein the one or more waxes are soy wax and paraffin wax.

12. The erasable writing composition of claim 11, wherein the soy wax is present in an amount between about 4.5 wt % and 20 wt %, and wherein the paraffin wax is present in an amount between 0.5 wt % and 5 wt %.

13. The erasable writing composition of claim 1, wherein:
the at least one particulate filler including a clay is present in an amount between about 40 wt % and 60 wt %;

the at least one leuco dye is present in an amount between about 0.5 wt % and 6 wt %;

the one or more waxes chosen from a-the group consisting of soy wax, paraffin wax, and beeswax are present in an amount between about 10 wt % and 20 wt %;

the at least one thermoplastic binder material including high density polyethylene and low density polyethylene is present in an amount between about 15 wt % and 25 wt %;

the titanium dioxide is present in an amount between about 3 wt % and about 12 wt %; and the optional at least one additive is present in an amount between about 0.5 wt % and 3 wt %.

14. A writing instrument comprising the erasable writing composition of claim 1.

15. The writing instrument of claim 14, wherein the writing instrument is produced via extrusion.

16. The writing instrument of claim 14, wherein the writing instrument is produced via injection molding.

17. The writing instrument of claim 14, wherein the writing instrument is encased within a sheath or covered in a protective coating layer.

18. The writing instrument of claim 17, wherein the writing instrument is encased with a sheath comprising at least one of wood or plastic.

19. The writing instrument of claim 14, wherein the writing instrument is in a pencil core shape.

* * * * *